Jan. 9, 1968  M. J. COHEN ET AL  3,363,100
RADIATION DETECTION SYSTEM FOR MISSILE SCORING
Filed May 27, 1963  4 Sheets-Sheet 1
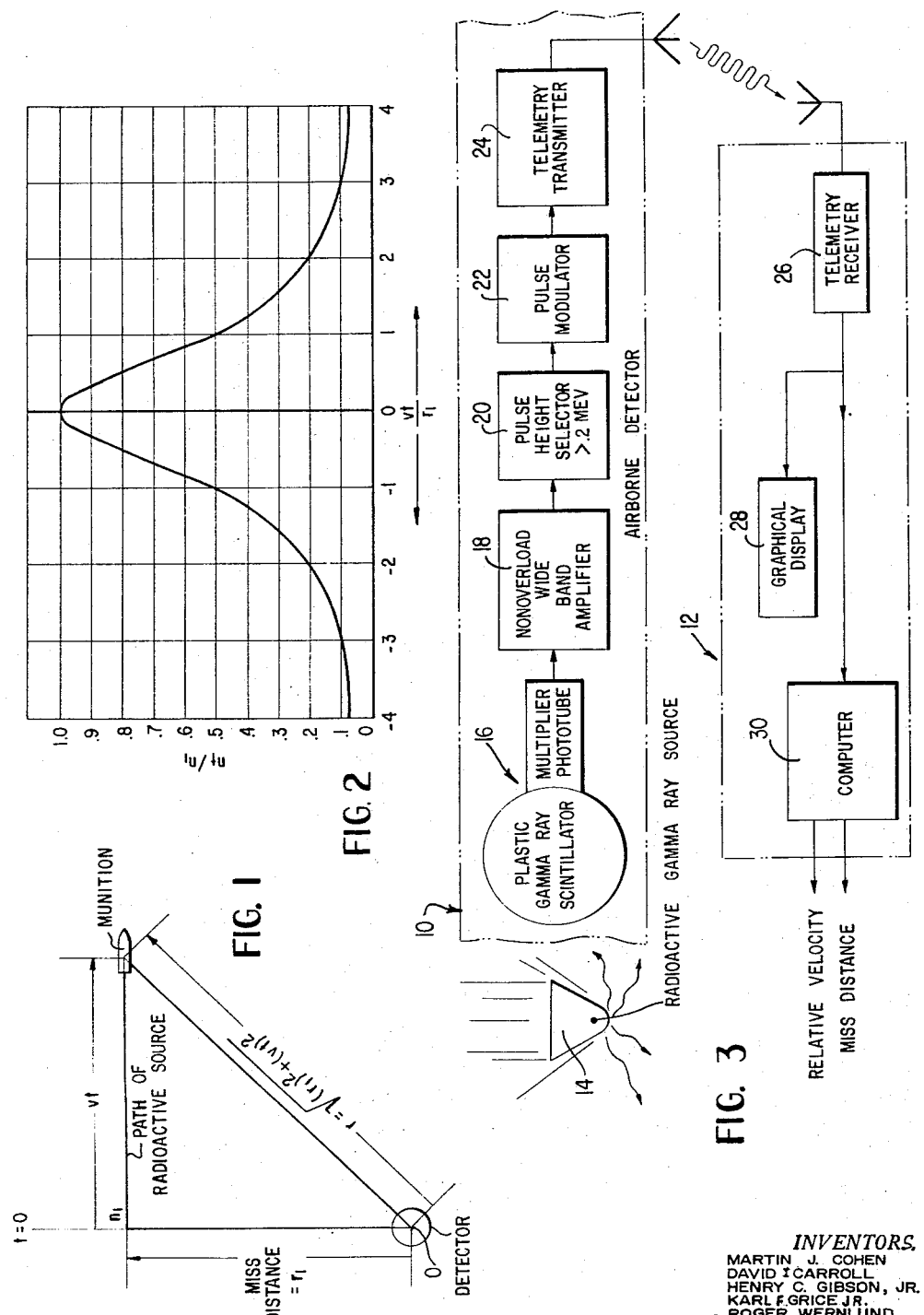
INVENTORS.
MARTIN J. COHEN
DAVID I. CARROLL
HENRY C. GIBSON, JR.
KARL F. GRICE JR.
ROGER WERNLUND
BY Raphael Semmes
ATTORNEY Jan. 9, 1968   M. J. COHEN ET AL   3,363,100
RADIATION DETECTION SYSTEM FOR MISSILE SCORING
Filed May 27, 1963   4 Sheets-Sheet 2

INVENTORS.
MARTIN J. COHEN
DAVID I. CARROLL
HENRY C. GIBSON, JR.
KARL F. GRICE JR.
ROGER WERNLUND
BY Raphael Semmes
ATTORNEY Jan. 9, 1968   M. J. COHEN ET AL   3,363,100
RADIATION DETECTION SYSTEM FOR MISSILE SCORING
Filed May 27, 1963   4 Sheets-Sheet 3
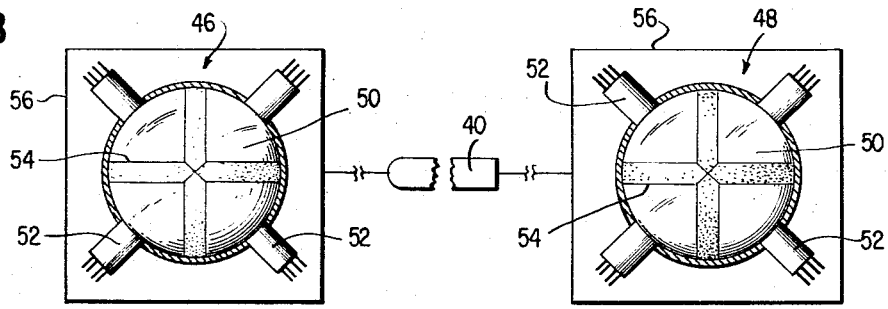
FIG. 8
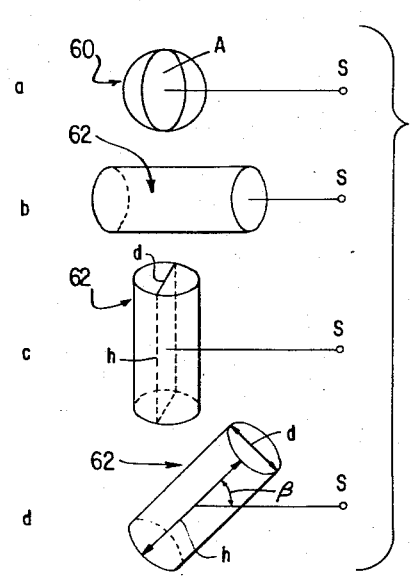
FIG. 9
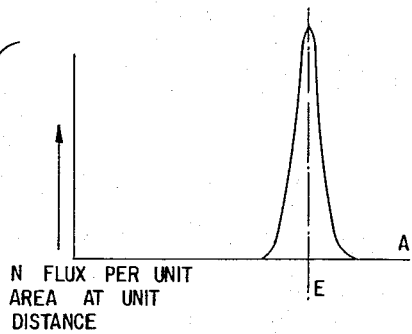
FIG. 11
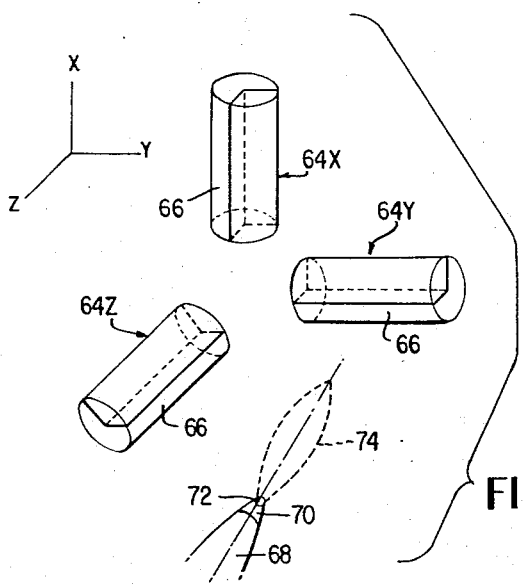
FIG. 10
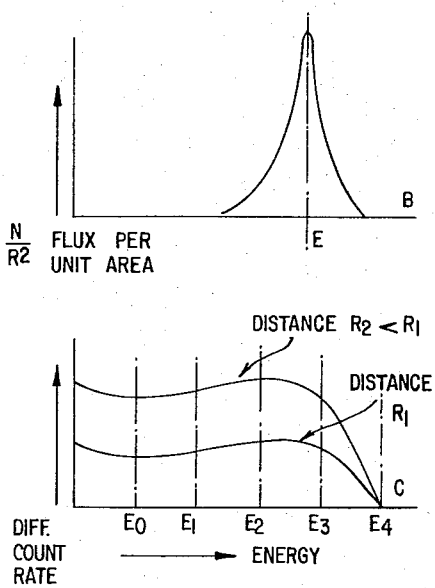
INVENTORS.
MARTIN J. COHEN
DAVID I CARROLL
HENRY C. GIBSON, JR.
KARL F. GRICE JR.
ROGER WERNLAND
BY Raphael Semmes
ATTORNEY

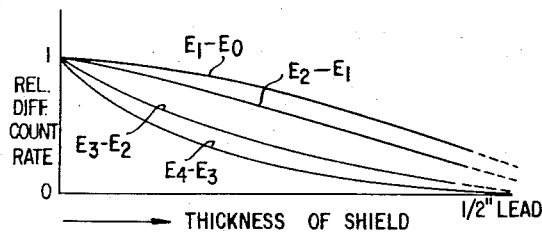
FIG. 12A
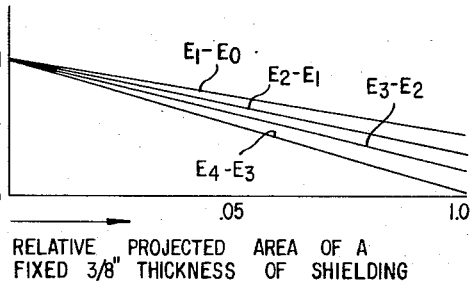
FIG. 12B
FIG. 13
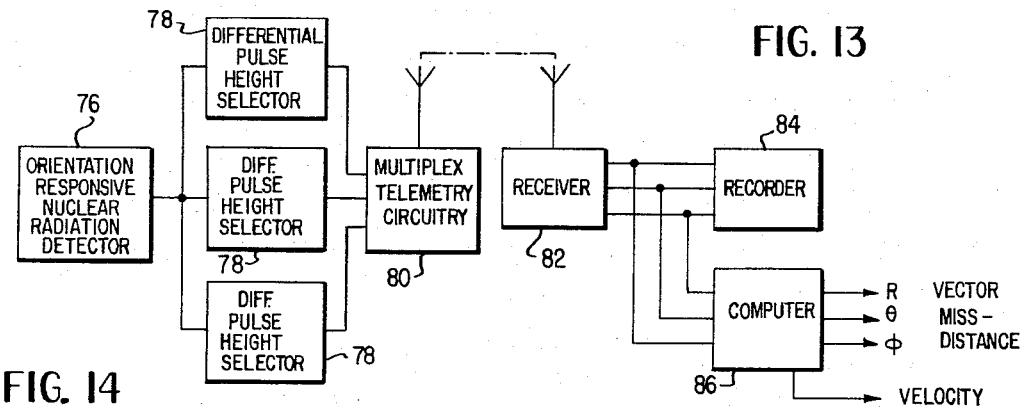
FIG. 14
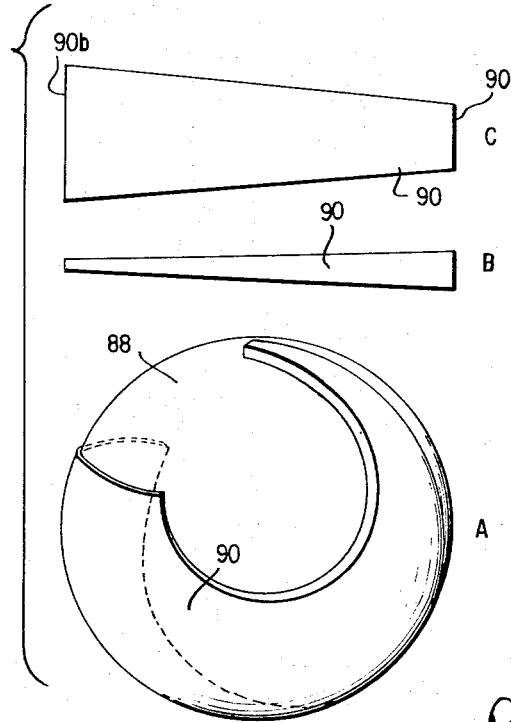
FIG. 15
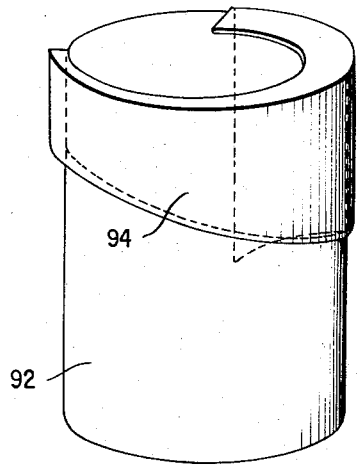
INVENTORS.
MARTIN J. COHEN
DAVID I. CARROLL
HENRY C. GIBSON, JR.
KARL F. GRICE JR.
ROGER WERNLUND
BY Raphael Semmes
ATTORNEY

# United States Patent Office 3,363,100
Patented Jan. 9, 1968

3,363,100
RADIATION DETECTION SYSTEM FOR MISSILE SCORING
Martin J. Cohen, West Palm Beach, David I. Carroll, Lantana, Henry C. Gibson, Jr., Palm Beach, Karl R. Grice, Jr., Lantana, and Roger F. Wernlund, Lake Worth, Fla., assignors to Franklin GNO Corporation, a corporation of Florida
Filed May 27, 1963, Ser. No. 283,477
17 Claims. (Cl. 250—71.5)

This application is a continuation-in-part of Serial No. 781,954, filed Dec. 22, 1958, now Patent No. 3,091,463, issued May 28, 1963.

This invention relates to systems for scoring munitions, missiles, or projectiles, and more particularly to systems for determining miss-distance or firing error, velocity, and trajectory through the use of nuclear radiation.

Scoring systems which are based upon a visual indication of the hits of munitions directly upon a target are well known. A common system employs an airborne target sleeve that is attached to a towing aircraft by a tow line or drag line. The scoring of munitions fired at the target sleeve may be determined by visual inspection. More elaborate schemes have been devised in which hits are scored by proximity of the munitions to the target. With such systems actual contact of the munitions with the target is not required. This is advantageous in order to simulate a large target with a small high velocity object, either towed or self-powered. Some of the systems employed heretofore use light waves, radio waves, shock waves, or electrostatic charges as the basis of miss-distance determination.

The present invention is based upon the use of nuclear radiation. More specifically, gamma rays are preferred, because of their long range in air, and high energy content. A missile scoring system employing such radiation has definite advantages over systems of other types. Among these advantages are the following:

(1) The radioisotope gamma ray source employed transmits radiation spontaneously and independent of ordinary environmental influences, such as temperature and pressure.

(2) The life of the source can be made as short or as long as desired. The decay of strength can be selected by radioisotope selection and can be calibrated from hours to years.

(3) The radiation is non-jammable by electronic equipment.

(4) The radiation does not interfere with other electronic equipment used in the system tests.

(5) The radiation is non-detectable outside of the design range.

(6) The system operates in an uncrowded region of the electromagnetic spectrum.

(7) The radiation penetrates conducting surfaces and ionized gas layers such as plasmas with negligible attenuation.

In addition, the gamma ray source is very small, is simple to associate with a missile, requires no external or internal power supply, and can be readily varied in magnitude to cover a large range of miss-distance. At higher altitudes and in outer space, alpha and beta radiation may also be used.

The copending application Ser. No. 781,954 discloses and claims systems for measuring scalar miss-distance in which missiles are provided with nuclear radiation material and a target is provided with a nuclear radiation detector, which produces an output dependent upon the level of the incident radiation during a missile pass. The measurements are substantially independent of the relative velocity between missile and target, because the system is designed to respond to the peak of the radiation count signal. If this signal exceeds a predetermined threshold, a hit is registered. By utilizing plural thresholds, hits within different ranges can be registered. Also disclosed and claimed is a system for computing and plotting missile trajectory, using a pair of multi-part directional radiation detectors.

Copending application Ser. No. 262,142, filed Mar. 1, 1963, now Patent No. 3,265,894, discloses and claims missile scoring systems utilizing substantially the entire nuclear radiation count signal during a missile pass. This permits the use of low activity radiation sources, but special provision must be made to eliminate the velocity dependence inherent in such measurements.

The present application discloses and claims systems which determine, by means of nuclear radiation, the relative velocity of missile and target in addition to the miss-distance. Moreover, the present application discloses and claims different systems for determining missile trajectory and/or vector miss-distance in two or three dimensions. This application also discloses and claims improved nuclear radiation detectors having response dependent upon the orientation of the detected radiation.

Accordingly, it is a principal object of the invention to provide systems and apparatus of the foregoing type.

Another object of the invention is to provide an improved missile scoring system which utilizes the entire radiation count signal.

Still another object of the invention is to provide systems of the foregoing type utilizing time coordinate information and/or energy level discrimination.

An additional object of the invention is to provide accurate, lightweight missile scoring systems, which are readily airborne.

The foregoing and other objects, advantages, and features of the invention, and the manner in which the same are accomplished will become more readily apparent upon consideration of the following detailed description of the invention in conjunction with the accompanying drawings, which illustrate preferred and exemplary embodiments of the invention, and wherein:

FIGURE 1 is an explanatory diagram illustrating certain principles of the invention;

FIGURE 2 is an explanatory graph to be considered in conjunction with the diagram of FIGURE 1;

FIGURE 3 is a block diagram of a system of the invention which measures miss-distance and relative velocity;

FIGURE 8 is a partly sectional diagrammatical illustration of directionally sensitive radiation detectors and associated apparatus which may be utilized in the system of FIGURE 7, as well as in other systems of the invention;

FIGURE 9 is a diagrammatic perspective view illustrating the response characteristics of different detector embodiments;

FIGURE 10 is a diagrammatic perspective view illustrating directionally sensitive detectors of the invention in conjunction with a directional radiation source;

Figure 4:
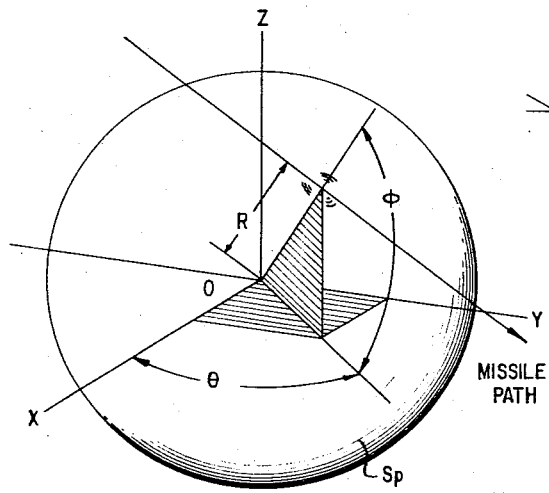
FIGURE 4 is an explanatory diagram illustrating the concept of vector miss-distance indication.

FIGURES 11A, 11B, and 11C are explanatory graphs illustrating radiation energy spectrums;

FIGURES 12A and 12B are explanatory graphs illustrating the effects of shielding upon different portions of the energy spectrum;

FIGURE 13 is a block diagram of a system of the invention employing energy discrimination;

FIGURES 14A, 14B, and 14C are respectively a perspective view of a directionally sensitive detector, and top and side views of an absorber (unfurled) employed in the detector; and FIGURE 15 is a perspective view of another form of directionally sensitive detector.

Introduction

Briefly stated, the scoring systems of the invention depend upon the "labeling" of missiles or projectiles with a source of nuclear radiation, such as gamma rays. Missile scoring is determined by the proximity or miss-distance of the missile with respect to a target. In general, the effective volume of the target is much greater than the volume of its actual configuration, being a function of the strength of the radiation source and the sensitivity of the radiation detector which may form a part of the target. For an omnidirectional miss-distance indicator, target volume is defined by a sphere centered about the detector, the radius $r_1$ of the sphere being determined by the distance of closest approach of the missile and the target.

In one embodiment of the invention, a signal dependent upon the level of radiation detected during a missile pass is transmitted from a target to a remote receiver connected to a computer for computing miss-distance and relative velocity. The signal may also be recorded graphically to provide a graphical method of measurement. In another embodiment of the invention, vector miss-distance and velocity may be obtained from a target having a plurality of spaced detectors, the outputs of which are recorded to provide time-sequential indications. Other embodiments of the invention employ single or plural directionally sensitive detectors for determining vector miss-distance, trajectory and velocity.

Theoretical analysis

A theoretical prologue will set the environment for the description of the systems of the invention which follows. Referring to FIGURE 1, it is assumed that a spherical nuclear radiation receiver or detector is located at O, the target center, and that the diameter of the receiver is $d$. The cross-sectional area, A, of such an omnidirectional receiver is $$A = \frac{\pi d^2}{4}$$

Assume that a munition carrying a source of nuclear radiation having an activity of C millicuries is traveling along a path such as that indicated in FIGURE 1. At any instant of time $t$ the missile is at a distance $r$ feet from the target at O, where $r$ is a function of $t$. If E is the efficiency of detection of the receiver, then the rate $n$ in photons per sec. detected by the receiver is given by the relationship:

$$n = \frac{3.7 \times 10^7 AEC}{4\pi r^2} \quad (1)$$

As set forth in the aforesaid prior applications, by suitable design the efficiency E may be maintained substantially constant. The factor AE expresses the receiver performance, and the term C the transmitter performance. The instantaneous count rate $n$ is a function of the distance $r$ between the missile and the target.

Assume that a munition is moving at a relative velocity of $v$ ft./sec. with respect to the target. Let $n_1$ be the peak counting rate value of $n$ received by the detector of cross-sectional area A and efficiency E from the radioactive source of activity C millicuries. From the source $C \times 3.7 = 10^7$ gamma photons per sec. are radiated. The relative velocity $v$ of interception may be considered as substantially constant in this analysis. Time $t = O$ occurs at distance $r_1$, which is the miss-distance or distance of closest approach of the source and detector.

The counting rate in counts/second at any other time, $t$, is given by:

$$n_t = \frac{r_1^2 n_1}{r_1^2 + v^2 t^2} \text{ counts sec.} \quad (2)$$

A dimensionless graph of this equation is given by $n_t/n_1$ as a function of $vt/r_1$ in FIGURE 2. The indefinite integral of Equation 2 is:

$$S = \int^t n_t dt = \int_{t_1}^{t_2} \frac{2 r_1 n_1}{r_1^2 + v^2 t^2} dt \text{ count} \quad (3)$$

which is evaluated to be:

$$S = \frac{r_1 n_1}{v} \operatorname{Tan}^{-1} \frac{vt}{r_1} \bigg|_{t_1}^{t_2} \text{ counts} \quad (4)$$

The peak count $n_1$ is given Equation 1 where $r = r_1$:

$$n_1 = \frac{3.7 \times 10^7 AEC}{4\pi r_1^2} \text{ counts/sec.} \quad (5)$$

In Equations 3 and 4, $t_1 t_2$ are arbitrary limits of the integration time. If $t_1$ and $t_2$ are increased without limit, then the value of $$\operatorname{Tan}^{-1} \infty = \pi/2 \text{ and } \operatorname{Tan}^{-1}(-\infty) = -\pi/2$$

For these values, $$S = \frac{r_1 n_1}{v} [\pi/2 - (-\pi/2)] = \frac{\pi r_1 n_1}{v} \text{ counts} \quad (6)$$

In Equation 6 S is the total number of pulses above the background counts which will contribute to the measurement in a missile pass. From a smoothed count rate pattern as a function of time, a curve similar to that of FIGURE 2, the miss-distance and velocity can be obtained when the values AEC are known.

The foregoing discussion has assumed that a signal $n$ in counts per sec. and a signal S in counts are quantities uniquely determined by Equations 1 and 6. This is strictly true only if the number $n$ is large. However, a determination of the average number of counts in the signal S can be and must be made in one munition pass. This is a statistical sampling problem well known to the statistics of measurements of random pulse samples in nuclear physics.

To evaluate the statistical nature of the random nuclear gamma photon signal the use of a standard statistical equation, namely, Poisson's relationship is required. This special case of the Gaussian distribution is given by the expression:

$$P_q = \frac{S^q e^{-S}}{q!} \quad (7)$$

Here $P_q$ is the relative probability of observing only $q$ counts in the missile pass above the background count rate, $e$ is the base of the natural logarithm, and S is the true average number of counts in the measurement period T.

If repeated missile passes or measurements are taken, a distribution of count measurement $q$ will occur about the true average value S such that the following standard statistical probability table of occurrence applies.

TABLE 1

| Value range: | Probability of occurrence, percent |
|---|---|
| $S \pm 1\sigma$ | 68 |
| $S \pm 2\sigma$ | 95 |
| $S \pm 3\sigma$ | 99.7 |

$\sigma$ is the standard deviation and is given by:

$$\sigma = \sqrt{S} \quad (8)$$

For a percentage of accuracy of P% where:

$$P = \frac{100\sigma}{S} = \frac{100\sqrt{S}}{S} = \frac{100}{\sqrt{S}} \quad (9)$$

a velocity, radioactivity and accuracy relationship for a typical detector can be derived using Equations 5, 6 and 9. Typically:

$$A = \frac{\pi d^2}{4}, \text{ where } d = 7 \text{ inches}$$

$$E = 0.4$$

Then:

$$S = \frac{10^4}{p^2} = \frac{\pi r_1}{v} \times \frac{3.7 \times 10^7}{4 \pi r_1^2} \times \frac{\pi}{4} \times \frac{7^2}{12^2} \times .4C \quad (10)$$

and by algebraic manipulation:

$$10^2 CP^2 = v r_1 \quad (11)$$

In actual practice C is the minimum radioactivity that will give P% measurement accuracy at miss-distance $r_1$ and velocity $v$. Using the strength C millicuries at closer distances $r_1$ and lower velocity $v$ will give a better accuracy P. Typical numerical values for velocity and miss-distance indication are given here to illustrate the quantities involved.

TABLE 2

| Tag Strength, Millicuries (C) | Accuracy, percent (P) | Distance ($r^1$) | v, ft./sec. | Missile-Target |
|---|---|---|---|---|
| 7.5 | 10 | 50 | 1,500 | Rockets-Tow Target. |
| 10 | 10 | 100 | 1,000 | Shells (5 inch)-Tow Target. |
| 30 | 10 | 100 | 3,000 | Shells (20 mm.)-Tow Target. |
| 75 | 10 | 50 | 15,000 | Rockets-ICBM Nose Cones. |
| 3,000 | 10 | 1,000 | 30,000 | Do. |
| 1,500 | 20 | 2,000 | 30,000 | Do. |

*Miss-distance and velocity indicator*

In the aforesaid co-pending applications, systems for measuring miss-distance are described in which velocity dependence is eliminated by taking measurements only during the short interval surrounding the peak of the count rate signal or by utilizing the entire count signal in a system having translating circuits designed to eliminate velocity dependence. FIGURE 3 is a block diagram of a system which utilizes the entire count rate signal and which employs a computer to evaluate the signal and to produce an indication of miss-distance as well as relative velocity. A graphical display is also produced, from which the miss-distance and velocity may be readily determined as will be described.

In the form shown, the apparatus 10 is part of an airborne target, while the apparatus 12 is remotely located, as at a ground station. A missile 14, such as an ICBM nose cone, is tagged with a radioactive source, such as a source of gamma rays. Suitable schemes for providing the radioactive source will be described later. The radioactivity detector 16 may comprise a plastic gamma ray scintillator, such as a sphere of polyvinyl toluene or the like coated with a thin layer of light reflecting material such as magnesium. The sphere is provided with a transducer, such as a multiplier phototube, for converting the light scintillations into electrical impulses, the window of the phototube being juxtaposed with an uncoated area of the sphere, for example, and the entire sphere and phototube being enclosed within a light tight housing, as is well known in the art. Such a detector is essentially omnidirectional. The electrical output from the phototube is applied to a wide band amplifier 18 capable of amplifying the output pulses from the phototube with minimum distortion. The output of the amplifier is applied to a pulse height selector 20, which may be a one shot multivibrator producing a pulse of predetermined width and amplitude in response to the application of pulses exceeding a certain height, corresponding to an energy level of greater than .2 mev., for example, as is known in the art. The pulse height selection may be obtained by requiring that the input pulses overcome a predetermined bias before an output pulse from the multivibrator can be produced. This reduces the effects of background radiation and spurious indications. The output of the pulse height selector actuates a pulse modulator 22 for modulating the carrier of a telemetry transmitter 24. Any suitable modulation system, such as frequency or amplitude modulation may be employed. The transmitter may be a Bendix TXV-13 or commercial equivalent. Any suitable telemetry method may be employed. For example, pulse width modulation may be utilized instead of amplitude or frequency modulation. Moreover, the count signal may be counted down by a scale of 2, 4, 8 or more before transmission.

The ground station 12 comprises appropriate telemetry receiving equipment 26 including circuits for demodulation to obtain a digital or analogue count rate signal. Standard circuitry is employed to produce a smooth analogue graphical display of the count rate as a function of time, such apparatus being indicated at 28 and producing a curve similar to the curve shown in FIGURE 2. The recorder itself may comprise a paper strip driven as a function of real time $t$ and a marking device such as a stylus driven orthogonally to the direction of movement of the paper as a function of the count rate $n_t$. The recorder may be calibrated to give in accordance with Equation 5 the miss-distance $r_1$ from the peak count rate $n_1$ shown by the graph. Transparent overlay templates previously prepared from calibration runs may be utilized to facilitate determination of $r_1$. The velocity $v$ can be determined from Equation 2 by inserting the value $r_1$, and the values of $t$ and $n_t/n_1$ read from the graph. (For example assume $t=0$ at $n_1$ and find the value of $t$ on the graph for some $n_t$ having a convenient ratio with $n_1$, such as 0.5.)

The ground station also includes the computer 30 to obtain miss-distance and velocity with maximum precision. For the computer solution the Equations 2 through 6 are used. The input to the computer is the count rate $n_t$ as a function of real time $t$. Programmed into the computer are the values of AEC and numerical constants. The computer evaluates a series of definite integrals of the type $$S_i = \int_{t_1}^{t_2} n_t dt$$

which is a multiple numerical solution of Equation 4 where $r_1$, $n_1$ and $v$ are to be determined. These equations look like $$S_i = \frac{r_1 n_1}{v} \tan^{-1} \frac{T_i}{r_1}$$

The $T_i$ and $S_i$ are measured by the computer from the input data. Typical $T_i$ may have values corresponding to the full width of the curve $n_t$ versus $t$ at .01 to .9 maximum values. Thus a series of $i$ simultaneous equations is formed. The computer solves these equations for $r_1$ and $v$. The additional redundancy of the equations as $i \geq 3$ improves the accuracy of the answer. The input signal is placed in a buffer storage or solved instantaneously depending upon the complexity of the computer. With buffer storage standard analogue computers of electronic type can be used. Larger digital computers can solve the problem using their internal storage means. For example, an IBM 1401 or RCA 504 computer may be employed.

*Vector miss-distance indication*

FIGURE 4 illustrates the geometry relevant to the problem of measurement of vector miss-distance, or in other words, the spherical coordinates of the missile at the point of closest approach to the target. It is assumed that the radioactivity detector is located at O, the center of a spherical coordinate system. The point of closest approach of the missile to the target is located on the sphere $S_p$ having a radius R, the miss-distance. The vector miss-distance is identified by R, and by the angles $\theta$ and $\phi$ located in the XY and YZ planes, respectively.

Qualitatively speaking, a vector miss-distance indicating system involves the transmission of sufficient three-dimensional information to obtain the spherical coordinates R, $\theta$ and $\phi$. The transmitted signal must therefore have distance as well as angular information, which can be evaluated, for example, by a properly programmed computer. The properties of a radioactive detector system which provide distance and orientation sensitivity are shape, shielding, and arrangement of detectors, pulse amplitude of detector output, and time of occurrence of peak signals from plural detectors. Systems which utilize these properties will be described hereinafter. In addition to providing vector miss-distance in three coordinates, the systems to be described may be utilized to provide two dimensional miss-distance information, quadrant miss-distance information, and line of flight or missile trajectory information. The basic characteristic of all of these systems is the ability to provide directional information, and not merely scalar information.

Figure 5:
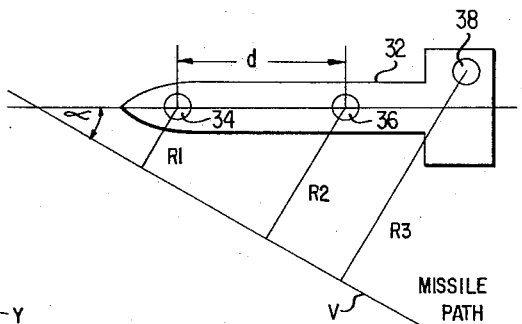
FIGURE 5 is an explanatory diagram illustrating one system of the invention for measuring vector miss-distance.

FIGURE 5 illustrates a simple directional system of the invention. The missile path is indicated at V, and an aerodynamically shaped target at 32. The target has a pair of omnidirectional nuclear radiation sensors 34 and 36 separated by a distance $d$. Each sensor may comprise a sphere of scintillation material in association with a multiplier phototube as described in connection with FIGURE 3. Each sensor may be associated with signal translating and telemetry apparatus of the type described in connection with FIGURE 3, and a common transmitter may be employed to transmit signals derived from the sensors to a remote ground station. For example, conventional schemes such as time-sharing may be employed to segregate the signals derived from the respective detectors.

Figure 6:
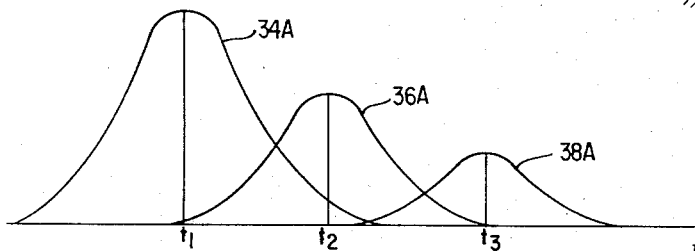
FIGURE 6 is an explanatory graph to be considered in conjunction with the diagram of FIGURE 5.

Assuming a nuclear radiation tagged missile travelling along the path V, and assuming that the signal from each sensor is recorded as described in connection with FIGURE 3, each sensor will produce a miss-distance curve of the type shown in FIGURE 6, curve 34A being a recording of the output of sensor 34 and curve 36A being a recording of the output of sensor 36. The curves may be recorded concurrently on a single strip of recording medium by multiple styli, for example, and may have parallel time axes. The peak of curve 34A occurs at time $t_1$, while the peak of curve 36A occurs at time $t_2$. The former peak corresponds to the miss-distance $R_1$ in FIGURE 5, while the latter corresponds to the miss-distance $R_2$. The angle $\alpha$ of the trajectory with respect to the line $d$ is given by:

$$\sin \alpha = \frac{R_2 - R_1}{d}$$

The velocity of the missile is:

$$v = \frac{d \cos \alpha}{t_2 - t_1}$$

The line of flight (missile path) can be anywhere on a conical surface of revolution about the axis $d$ determined by the angle $\alpha$. A third detector 38, which may be omnidirectional, is spaced laterally from the axis $d$ (as well as longitudinally from detector 36), and if this detector is above or below the axis, ambiguity as to the location of the missile path above or below the axis is resolved by a recording 38A (FIGURE 6) corresponding to the output of sensor 38. This curve may be recorded on the same recording medium as the previous curves and has a peak value at time $t_3$ corresponding to the miss-distance $R_3$ in FIGURE 5. In the example illustrated, since the peak of curve 38A is less than the peak of curve 36A (assuming equal sensitivity) the missile path is determined to be below the axis $d$. However, there remains an ambiguity as to the location of the missile path on the portion of the conical surface below a horizontal plane through the axis $d$. This ambiguity may be eliminated from knowledge of the direction of firing of the missile with respect to the target or by employing a sensor 38 which is orientation sensitive in a plane perpendicular to the axis $d$. In other words, sensor 38 must have an output which is a single-valued function of the direction of the impinging radiation, assuming a given radiation tag strength and a given distance from the sensor. The vector miss-distance and missile velocity can be read-out quickly from the recorded curves. The readings may be facilitated by utilizing overlay templates obtained from calibration runs. Moreover, if desired, a computer may be employed to analyze the information obtained from the various sensors.

Sensor 38 in the embodiment of FIGURE 5 may also be a quadrant type to be described in connection with FIGURE 8. Such a detector offset from the axis $d$ is capable of resolving the ambiguity of the location of the missile path on the aforesaid conical surface of revolution.

Figure 7:
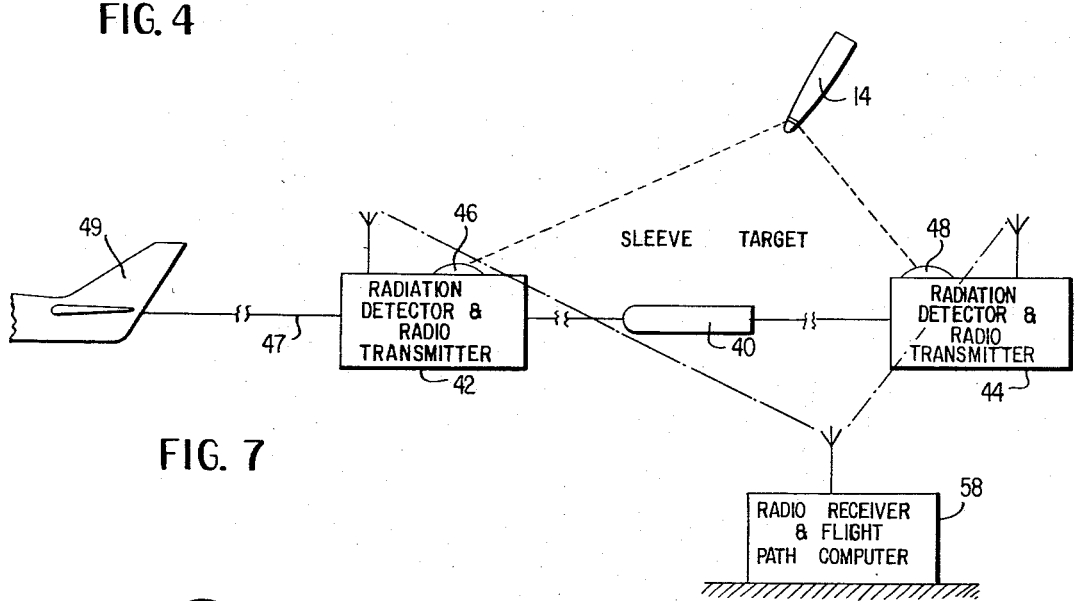
FIGURE 7 is an explanatory diagram illustrating a system for determining missile flight path or trajectory, the system being disclosed and claimed in the aforementioned S.N. 781,954.

FIGURES 7 and 8 illustrate a system capable of determining missile trajectory and employing a pair of orientation sensitive nuclear radiation detectors. This system is described and claimed in the aforementioned S.N. 781,954, but is described here because the principles of the system are useful in understanding the systems and components claimed herein. The target comprises a sleeve 40 of conventional type but preferably smaller in size than the conventional sleeve, and a pair of radiation detector and radio transmitter units 42 and 44 which are arranged at opposite sides of the sleeve 40. The various parts of the target are attached to a towline 47 which is pulled by an aircraft 49. The effective target volume is determined, inter alia, by the spacing of the units 42 and 44. The sleeve 40 forms the visible target center. By proper use of miniaturized, lightweight components, the entire target assembly including units 40, 42 and 44 may weigh no more than the conventional sleeve target. Although units 42 and 44 are shown in block form, in practice these units will have an aerodynamical designed housing so that the drag will be minimized.

The same basic target construction can be used for ranges from 200 to about 2,500 feet by changing only the spacing between the units 42 and 44 on the towline from 50 to 1,000 feet. The strength of the nuclear source on the missile 14 is selected to fit the type of missile and the effective target size. The design of radiation source and detector may be based on an accuracy of miss-distance measurement of 5% to 10% of the detector spacing near the target center and 10% of the maximum range near the periphery.

Units 42 and 44 are preferably self-powered units including a radiation detector head 46 or 48, an amplifier, and a small telemetering transmitter. The power pack can be made very small if the units are energized by a remote signal for the very short time that the target is under attack. Alternatively, an air driven generator could be used for the power supply.

In order to obtain an accurate plot of the path of the missile relative to the target, each detector head is made directional. In FIGURE 8 the respective heads are shown at 46 and 48, each including a sphere of scintillation material 50, a plurality of photomultiplier tubes 52, crossed lead divider plates 54, and a light tight housing 56. In the form shown the divider plates 54 separate each detector into quadrants, each quadrant of scintillation material having its own photomultiplier tube in contact therewith. As previously described, the scintillation material may be coated with suitable reflecting substances. With radiation detectors of the type shown, overlapping directional radiation sensitivity patterns are produced.

The outputs of the respective detector head sections are transmitted from units 42 and 44 to a radio receiver and flight path computer unit 58 (FIGURE 4) which may be located on the ground. The outputs of the various detector sections will vary with the radiation received and hence with the range and direction of the missile with respect to the target. Since the spacing between the units 42 and 44 is known, the flight path of the missile with respect to the target may be readily computed from the relative outputs of the respective detector head sections. The radioactive data may be supplemented by the known ballistic properties of the missile and the altitude and velocity of the target. The computed flight path of the missile may be presented as a two dimensional graphic display in a plane of flight. The third dimension may be determined by the angular coordinates of this plane of missile flight with respect to the target path. From the computed flight path of the missile relative to the path of the target, the miss-distance can be readily determined, as well as the relative velocity.

The following tables give two practical examples of cases in which the invention illustrated in FIGURES 7 and 8 may be employed. In Case 1 the data concerns a small missile such as a 90 mm. shell, while in Case 2 a large missile is assumed.

CASE 1

Projectile—90 mm. shell.
Target Region—Sphere—600 feet diameter.
Nuclear radiation—Choice of Sodium 24, Cobalt 60 and others.
Strength—10 millicuries (Symmetrical radiation pattern).
Radiation field—13 milliroentgens per hour at 1 meter.
With no shielding—1.3 milliroentgens per hour at 10 feet.
Target Receiver—300 to 1,000 cm.² sensitive receiving area; choice of reception pattern depending on requirements.
Receiver Spacing—200 feet on tow line.
Total Receiver Weight (in aerodynamic housing)—10–25 pounds depending upon design.
Other design features—a—Signal rate at target when projectile is at maximum range: 2,000 counts per second; b—Signal rate at center: 20,000 c.p.s.; c—Projectile closing speed: 3,000 f.p.s.; d—Duration of signal: ⅕ second.
Accuracy—±4 feet at center; ±30 feet at periphery.

CASE 2

Projectile—Missile.
Target Region—Sphere 1 mile in diameter.
Radiation emitter properties—Cobalt 60, 10 curies, 0.1 cubic inch volume, weight less than 1 ounce.
Radiation Field—Since no personnel are in the vicinity of the in-flight missile, a strong source can be used with no shielding. For installation and maintenance appropriate shields can be easily used. (The source placed in an 80 pound spherical lead or 45 pound tungsten shield is non-hazardous for storage and handling.)
Receiver—300 to 1,000 cm.² effective sensitive receiving area of each receiver; choice of reception pattern depending upon requirements.
Receiver Spacing—1,000 feet.
Total Receiver Weight—10–25 pounds with aerodynamic housing.
Other Design Features—a—Signal rate at maximum range: 200 counts per second; b—Signal rate at center: 40,000 counts per second; c—Projectile Speed: 1,000 feet per second; d—Duration of Signal: 5 seconds.

The following table gives representative miss-distance design parameters. In this table it is assumed that two radiation detectors are spaced on a towline, each detector with a 1,000 square centimeter effective area.

| Transmitter Strength | Receiver Spacing (ft.) | Maximum Miss-Distance and Accuracy | Minimum Miss-Distance and Accuracy | Type of Projectile |
|---|---|---|---|---|
| .001 | 50 | 200 feet±20 feet | Zero feet±1 foot | Small caliber ammunition. |
| .010 | 200 | 300 feet±30 feet | Zero feet±4 feet | Shells and rockets. |
| .100 | 200 | 400 feet±40 feet | Zero feet±1 foot | Do. |
| 10 | 1,000 | 2,500 feet±250 feet | Zero feet±20 feet | Guided missiles. |

In the embodiment of FIGURE 8 each detector head, 46 or 48, is actually an array of four sensors, each of which is oriented to respond to radiation from a particular quadrant. An unmodified spherical detector has an isotropic response to a point radiation source. With reference to FIGURE 9a, the spherical detector is shown diagrammatically at 60 and the source at S. The output signal of the detector is equal to a constant multiplied by the projected area A of the detector normal to the direction of the point source S. With a spherical detector, A is a constant, independent of the angular position of the point source with respect to the detector. For other shapes, A is not a constant. For example, if the detector is a long thin cylinder, as shown in FIGURES 9b, 9c, and 9d, A varies as the cosine of the angle B between the longitudinal axis of the cylinder and the direction of the source S (see FIGURE 9d). The minimum value of A is:

$$= \frac{\pi d^2}{4}$$

as shown in FIGURE 9b, and the maximum value is $A = dh$, as shown in FIGURE 9c.

A vector miss-distance indicator can be built utilizing three directional detectors with a sufficient number of telemetry channels to give a trajectory recording system. Such a system yields a three-dimensional picture of the position of the missile carrying a point radiation source as the missile passes a target which has the three-directional detectors. For example, as shown in FIGURE 10, three cylindrical detectors 64X, 64Y, and 64Z may be arranged orthogonally, corresponding to the arrangement of othogonal coordinate axes X, Y, Z as shown. Quadrant ambiguity can be eliminated by use of suitable shielding as in FIGURE 10, wherein ¾ of each cylinder is covered with shielding material 66 so that only ¼ of each cylinder is exposed to the radiation. Quadrant error may also be resolved by the use of detectors of dissimilar shape or by the addition of another asymmetric detector, the output of which will vary depending upon the quadrant of the missile pass. While in FIGURES 9 and 10 only the scintillators of the detectors are shown, a photomultiplier, light shield, etc. will be associated with each of the scintillators in the usual manner.

Specialized radiation patterns for emitters can be used in conjunction with scoring systems to obtain missile attitude in yaw, pitch, or roll. These patterns can be obtained by the use of apertured shielding to permit emission of the radiation in a desired direction. For example, in FIGURE 10 the missile 68 has a radiation source covered by a shield 70, with an aperture 72 for emission of radiation in accordance with the directional pattern 74 shown in dotted lines. If the axis of the radiation pattern is skewed with respect to the axis of the missile, information as to roll in addition to yaw and pitch may be obtained.

While it is apparent that sensor shaping and shielding may be employed to impart a directional response to a sensor, it should also be noted that such schemes may be employed to perfect the omnidirectional response of a desired omnidirectional detector. For example, in a practical target there is always a housing around the detector, which includes the electronics of the instrument as well as the target body with other electronics, engine, rockets, etc. In order to allow for the gamma radiation absorption as a function of the "look angle" it is necessary to do either of the following:

(a) Add absorber (shielding) over the scintillator so that the absorption as a function of angle is uniform. Absorber (such as lead or aluminum) is added in those directions where the target does not absorb, to obtain uniformity.

(b) Make the projected area of the scintillation detector variable as a function of angle. The projected area A is made larger in the direction where the target absorbs radiation. Thus with a rocket, where fore and aft the target absorbs say 20% of the incident radiation, the scintillator is increased in area by 20% to form an oblate spheroid.

In the foregoing embodiments, vector information is obtained by utilizing a plurality of nuclear radiation sensors. It is also possible, in accordance with the invention, to obtain vector information from an appropriately constructed single sensor by the use of energy level discrimination.

The radioisotope associated with the missile emits monoenergetic gamma photons. For example, zinc 65 emits 1.12 mev. photons. The curve in FIGURE 11A, a plot of flux per unit area at unit distance vs. energy, is typical of the narrow spectrum of a monoenergetic gamma source. The narrow spectrum is broadened slightly by some absorption and scattering in the tag housing on the missile, as indicated by the curve in FIGURE 11B, a plot of flux per unit area divided by the square of range vs. energy. This curve has substantially the same shape at the detector, except for the space-function reduction of intensity and the effect of some absorption material, which may be associated with the target. As the result of the detection process, for example in a plastic scintillator, some gamma photons produce small light pulses, others larger light pulses, and others still larger light pulses. The net effect is a blurring of the spectrum, the number of photons counted being a function of amplitude as indicated in FIGURE 11C, a plot of differential count rate vs. energy. The original peak of energy, FIGURE 11A, is associated with the edge of the response curve of FIGURE 11C, two curves being shown for different miss-distances. The total number of pulses counted is related to the area under the curve. This number is smaller than the total number of photons incident on the sensor because of the inefficiency of the detection process, wherein a certain number of photons do not produce a sufficient light pulse to be counted.

From the curves of FIGURE 11C it is apparent that energy discrimination (spectrum selection) can be obtained by connecting the output of the transducer, such as the photomultiplier tube, to differential pulse height selection circuits. For example, the pulses corresponding to the photons dissipating an energy between $E_0$ and $E_1$, or $E_1$ and $E_2$, or $E_2$ and $E_3$ may be passed by three independent data channels having differential pulse height selectors. Such selectors are well known in the art. For example, each selector may comprise a pair of threshold circuits (biased trigger circuits) connected to an anti-coincidence circuit which triggers a one shot multivibrator only when the lower threshold is exceeded, but not the upper. The absolute and relative numbers of pulses falling into each channel may be adjusted by shaping the scintillator, shaping the shield, and by selection of shield material.

The effect of shield thickness upon the relative differential count rate (normalized at zero shield thickness) in four channels is illustrated in FIGURE 12A, wherein the shield thickness varies from zero to one-half inch lead. Each differential energy channel is affected differently by the shield thickness. The large pulses, which represent maximum energy dissipation in the plastic, suffer the maximum rate of decrease as thickness increases. The gamma photons producing high energy pulses are relatively more affected by the shield because of energy absorption and scattering. At lower than maximum energy there is a creation of lower energy photons due to scattering. A predominantly photoelectric absorption type shield, like lead, will give a different response than the same weight of shield such as aluminum. Aluminum generates relatively more lower energy gamma from the incident gamma photons, due to the Compton absorption and scattering mechanism. The usable range of thickness is dependent upon obtaining a statistically significant count through the absorber. Thus, thickness which absorbs 70% to 80% of the radiation will probably be the normal maximum. Source strength has to be increased to make the weakest signal statistically valid.

FIGURE 12B illustrates the relative effect of the projected or effective area of a fixed thickness (⅜" of lead shield upon an otherwise homogeneous scintillation detector). Again, it will be noted that the effect differs in accordance with the energy level.

FIGURE 13 illustrates in block diagram a system employing energy discrimination to obtain data for a vector miss-distance indicator from an orientation responsive nuclear radiation detector. The detector is indicated at 76 and is of the type which is shaped and/or shielded or otherwise constructed to have uniquely anisotropic orientation sensitive response. Typical detectors of this type will be described hereinafter. It suffices to state at this point that the construction of the detector 76 is such that the response of the detector is different for every different combination of the spherical coordinates R, $\theta$, and $\phi$ designating the location of the radiation source with respect to the detector. By response is meant the output of the detector transducer (e.g., photomultiplier) in terms of numbers of pulses per unit time and pulse energy levels, for a source of nuclear radiation having predetermined activity. Thus, by employing a sufficient number of differential energy channels to "analyze" the response, the spherical coordinates of the source can be uniquely determined. In general, the accuracy will be a function of the number of channels employed and of the strength of the nuclear radiation source.

In FIGURE 13 the output of the transducer of the detector 76 is shown connected to a plurality of differential pulse height selectors 78 which may feed standard telemetry circuitry 80, such as a telemetry transmitter having time or frequency division multiplex. It is thus possible to transmit data from each of the differential energy channels to a remote telemetry receiver 82, the output of which is a replica of the data in the channels associated with the transmitter. This data may be recorded by a recorder 84 and may be applied to a computer 86, which is properly programmed to produce the spherical coordinates and velocity of the missile. Vector miss-distance, and missile trajectory may be determined and recorded, if desired. In effect the computer solves the simultaneous equations represented by the signals in the respective channels and produces an output accordingly.

FIGURE 14 illustrates a typical anisotropic detector of spherical form. A sphere 88 of suitable plastic scintillator material, for example, is enveloped by an absorber of a preselected shape. For example, as indicated in FIGURES 14B and 14C a triangular absorber, of say lead, is employed, the absorber having a uniformly varying width and thickness, the tapers being oppositely directed along the length of the absorber. There is thus a thick section at the apex 90a and a thin section at the base 90b. The absorber may be embedded in or placed upon the detector sphere as indicated in FIGURE 14A, the absorber being shaped to conform to the spherical shape of the scintillator. The transducer (for example, photomultiplier tube) is not shown, but it is associated with the surface of the scintillator in the usual manner. Light reflecting coatings and a light tight housing may also be employed in the manner previously described.

It is apparent that from a qualitative point of view the gamma photon emission for a radioactive source passing the detector of FIGURE 14 will yield an envelope of count rate as a function of time which is some function of orientation. The missile, as it passes the target, "sees" the detector from various positions. In each instantaneous location, the number and energy of the light pulses produced in the scintillator by the impinging gamma photons are primarily a function of the projected area of the scintillator and the projected thickness of the absorber covering the scintillator. The source of gamma photons is essentially monoenergetic if a source such as zinc 65 is employed, and the passage of the gamma photons through the air leaves the spectrum of gamma ray energy essentially undisturbed to a range of about 100 feet (depending on the degree of disturbance tolerable). The target material is considered part of the absorber on the scintillator. All of the measured effects of spectrum attenuation and alteration are associated with the detector.

FIGURE 15 illustrates an anisotropic detector of cylindrical form. A cylinder 92 of scintillation material is associated with an absorber 94, which varies in width and thickness in the manner illustrated. The shape of the absorber is similar to that of FIGURE 14, but the absorber is wrapped about one end of the scintillator as well as the side. Other types of anisotropic detectors may also be utilized in the invention.

*The nuclear radiation source*

For the radioisotope label it is desirable to use a material having a moderately short half-life activity in order to eliminate radioactive accumulation. However, a very short half-life leads to practical problems of maintaining constant transmitter activity. As set forth previously, another requirement for the radioisotope is that the peak of gamma ray energy emitted should be appreciably higher than say 1 mev. The following table is a list of certain radioisotopes, their half-life, and the energy of the gamma rays emitted.

| Element | Half-life | Principal Gamma Rays |
| --- | --- | --- |
| Sodium 24 | 15 hours | 2.7 mev. |
| Iodine 131 | 8 days | 0.34 mev., 0.64 mev. |
| Barium 140-Lanthanum 140 | 12.8 days | 2.3 mev., 2.6 mev., 2.9 mev. |
| Antimony 124 | 60 days | 1.7 mev., 2.1 mev. |
| Scandium 46 | 85 days | .90 mev., 1.12 mev. |
| Zinc-65 | 250 days | 1.12 mev. |
| Ruthenium 106-Rhodium 106 | 1 year | 1.55 mev., 2.41 mev. |
| Cobalt 60 | 5.3 years | 1.17 mev., 1.33 mev. |

In view of the criteria expressed previously, it is apparent that antimony 124 and zinc-65 are suitable radioisotopes.

Several methods of attaching the radioisotope label to the munition may be employed. The required radioactive material may be combined in a continuous foil or thin plastic as an insoluble material. Ceramic, clay, and glass type chemical compounds have recently found wide usage in insoluble binding of radioactive materials. Such a compound can be put into strip form, say $\frac{1}{16}''$ wide and .005 inch thick and supplied in a storage magazine. The magazine can be placed in a simple hand tool which will dispense a segment of this strip to the munition along with a high tack thermosetting adhesive. Rubber based and epoxy based adhesives with very high instant tack strength which increases with time and heat may be employed.

The device which attaches the radioisotope material to the shell can also select the proper amount of activity by determining the area of foil to be attached. With zinc 65 (half-life 250 days) a foil diameter of $\frac{1}{16}$ of an inch can be used initially. This area can be progressively increased if the originally supplied strip of foil is not used up in say 40 days. Every 40 days 10% more area is added to the foil to keep the shell activity the same. This can be done automatically by suitable time control.

Other ways of associating the radioactive source with the munitions are as follows:

(1) By mixing the radioactive material as an ingredient of the shell material during manufacture of the munitions.
(2) By nuclear pile activation of the shell material.
(3) By application of an adherent plating or paint.
(4) By inserting an active core in the munition.

From the foregoing description of the invention it is apparent that unique missile scoring systems are provided. While preferred embodiments of the invention have been shown and described, it will be apparent to those skilled in the art that changes can be made without departing from the principles and spirit of the invention, the scope of which is defined in the appended claims. For example, while systems have been described in which the radiation source is associated with a missile and the detector is associated with a target, the arrangement may be reversed so that the missile carries the detector and the target carries the source. Moreover, it is apparent that the invention is not useful solely for testing munitions or weapons, but may be employed with respect to space vehicles, aircraft, ground or sea craft, or objects generally, to determine proximity. Accordingly, the foregoing embodiments are to be considered illustrative, rather than restrictive of the invention, and those modifications which come within the meaning and range of equivalency of the claims are to be included therein.

The invention claimed is:

1. A nuclear radiation detector of the type described, comprising a single body of nuclear radiation sensitive material and means which renders the response of said material to a point source of nuclear radiation uniquely anisotropic in three dimensions.

2. The detector of claim 1, said means comprising adjacent to said body a radiation absorber, the effective projected area of which to said source varies as a function of the orientation of said source relative to said detector.

3. The detector of claim 1, said means comprising adjacent to said body a radiation absorber, the effective thickness of which to said source varies as a function of the orientation of said source relative to said detector.

4. A nuclear radiation detector of the type described, comprising a body of nuclear radiation sensitive material having an inherent three-dimensional omnidirectional response, and absorber means for rendering the effective response of said detector uniquely anisotropic in three dimensions.

5. The detector of claim 4, said absorber means comprising a shield covering a portion of said body.

6. A nuclear radiation detector comprising a sphere of gamma radiation sensitive material divided into separate gamma radiation-detecting sectors by gamma radiation shield means, each of said sectors having a corresponding means for producing an output dependent upon the radiation sensed by that sector.

7. The detector of claim 6, said shield means comprising a pair of crossed plates dividing said material into quadrants.

8. A nuclear radiation-detector comprising a cylinder of radiation sensitive material having a portion thereof covered by a radiation shield, said shield having a cross-section which varies in thickness and width for rendering the response of said detector to a point source uniquely anisotropic in three dimensions.

9. A nuclear radiation detector comprising a sphere of radiation sensitive material having an asymmetrical shield means thereon for rendering the response of said detector to a point source of radiation uniquely anisotropic in three dimensions.

10. The detector of claim 9, said shield means having a cross-section which varies in thickness and width.

11. In a system of the type described, a single radiation detector of the type having an output covering a substantial energy spectrum, means for rendering the response of said detector to a point source of radiation uniquely anisotropic in three dimensions, and means for producing separate signals in response to different portions of said spectrum.

12. Apparatus of the type described, comprising three directionally sensitive nuclear radiation detectors defining three orthogonal planes of a coordinate system, and means responsive to the output of said detectors for determining the location of a source of said radiation with respect to said coordinate system.

13. The apparatus of claim 12, said detectors being cylindrical.

14. The apparatus of claim 12, said detectors having a portion thereof provided with a radiation absorber.

15. The apparatus of claim 12, said detectors being oriented with their axes mutually orthogonal.

16. A nuclear radiation detector comprising a sphere of scintillation material embraced by a radiation absorber conforming to the curvature of said sphere, having spaced ends, and which in a flat state is trapezoidal with decreasing thickness toward the base.

17. A nuclear radiation detector comprising a cylinder of scintillation material having one cylindrical extremity embraced by a radiation absorber conforming to the curvature of said cylinder, having spaced ends with oppositely tapered cross-dimensions between said ends, and having a portion overlapping an end of said cylinder, said portion being tapered in width and thickness.

References Cited

UNITED STATES PATENTS

| | | | |
|---|---|---|---|
| 2,648,012 | 8/1953 | Scherbatskoy | 250—71.5 |
| 2,785,314 | 3/1957 | Grahame | 250—71.5 |
| 2,830,187 | 4/1958 | Scherbatskoy | 250—71.5 |
| 2,946,889 | 7/1960 | Muench | 250—71.5 |
| 2,967,933 | 1/1961 | Scherbatskoy | 250—71.5 |
| 3,018,374 | 7/1962 | Pritchett | 250—71.5 |
| 3,022,076 | 2/1962 | Zito | 273—102.2 |
| 3,030,049 | 4/1962 | Pilkington | 244—14 |
| 3,047,721 | 7/1962 | Folsom | 250—71.5 |
| 3,090,583 | 5/1963 | Behren | 244—14 |
| 3,091,463 | 5/1963 | Cohen | 273—102.2 |
| 3,113,215 | 12/1963 | Allen | 250—108 |
| 3,121,794 | 2/1964 | Held | 250—108 |
| 3,147,378 | 9/1964 | Hall | 250—71.5 |

OTHER REFERENCES

K40 Gammas Give Estimate of Lean Meat Content by Pringle et al., Nucleonics, February 1961, pp. 74, 76 and 78.

ARCHIE R. BORCHELT, *Primary Examiner.*

JAMES W. LAWRENCE, RALPH C. NILSON,
*Examiners.*